United States Patent
Lee

(10) Patent No.: US 7,039,111 B2
(45) Date of Patent: May 2, 2006

(54) FILM MODE DETECTING APPARATUS AND METHOD THEREOF

(75) Inventor: Seung-jun Lee, Seoul (KR)

(73) Assignee: Samsung Electronics Co., Ltd., Kyungki-do (KR)

(*) Notice: Subject to any disclaimer, the term of this patent is extended or adjusted under 35 U.S.C. 154(b) by 729 days.

(21) Appl. No.: 10/265,720

(22) Filed: Oct. 8, 2002

(65) Prior Publication Data

US 2003/0099296 A1    May 29, 2003

(30) Foreign Application Priority Data

Nov. 28, 2001  (KR) .............................. 2001-74729

(51) Int. Cl.
*H04N 7/12*   (2006.01)

(52) U.S. Cl. ................. 375/240.16; 348/700; 348/451; 348/558

(58) Field of Classification Search ........... 375/240.16; 348/699, 700, 97, 446, 448, 451–452, 558
See application file for complete search history.

(56) References Cited

U.S. PATENT DOCUMENTS

| | | | | |
|---|---|---|---|---|
| 5,365,273 A | * | 11/1994 | Correa et al. | 348/452 |
| 5,610,662 A | * | 3/1997 | Hackett | 348/452 |
| 5,734,420 A | * | 3/1998 | Lee et al. | 348/97 |
| 5,742,351 A | * | 4/1998 | Guede | 348/459 |
| 6,108,041 A | * | 8/2000 | Faroudja et al. | 348/446 |
| 6,897,903 B1 | * | 5/2005 | Hu | 348/700 |
| 2001/0002853 A1 | * | 6/2001 | Lim, II | 348/558 |
| 2001/0021224 A1 | * | 9/2001 | Larkin et al. | 375/240.16 |

OTHER PUBLICATIONS

Hilman et al, "Using Motion-Compensated Frame-Rate Conversion for the Correction of 3:2 Pulldown Artifacts in Video Sequences", IEEE Transactions On Circuits and Systems For Video Technology, vol. 10, No. 6, pp. 869–877, Sep. 2000.*

* cited by examiner

Primary Examiner—Vu Le
(74) Attorney, Agent, or Firm—Sughrue Mion, PLLC

(57) ABSTRACT

A film mode detecting apparatus and method for detecting a film mode by using a periodicity of motion vectors having high autocorrelativity. A motion vector calculating unit adds a size of motion vectors with respect to each field, thereby outputting a first computing value. A peak value eliminating unit detects a peak value from the first computing value, and if the peak value is detected, eliminates the peak value from the first computing value and outputs a resultant value. A mode detecting unit compares an autocorrelation coefficient with a predetermined threshold, thereby outputting a film mode detection signal. The autocorrelation coefficient is obtained from an input signal inputted from the peak value eliminating unit and a delayed signal delayed from the input signal. A mode determining unit determines a film mode when the film mode detection signal is input as often as, or more often than, a first reference value. A scene change detecting unit is further provided for detecting a scene change when the peak value is detected by the maximum value detecting unit, by comparing the detected peak value with a previously detected peak value, and outputting a scene change detection signal to the mode determining unit. In this case, the mode determining unit determines whether it is a film mode or not in accordance with the detection result from the scene change detecting unit based on a second reference value which is greater than the first reference value.

14 Claims, 5 Drawing Sheets

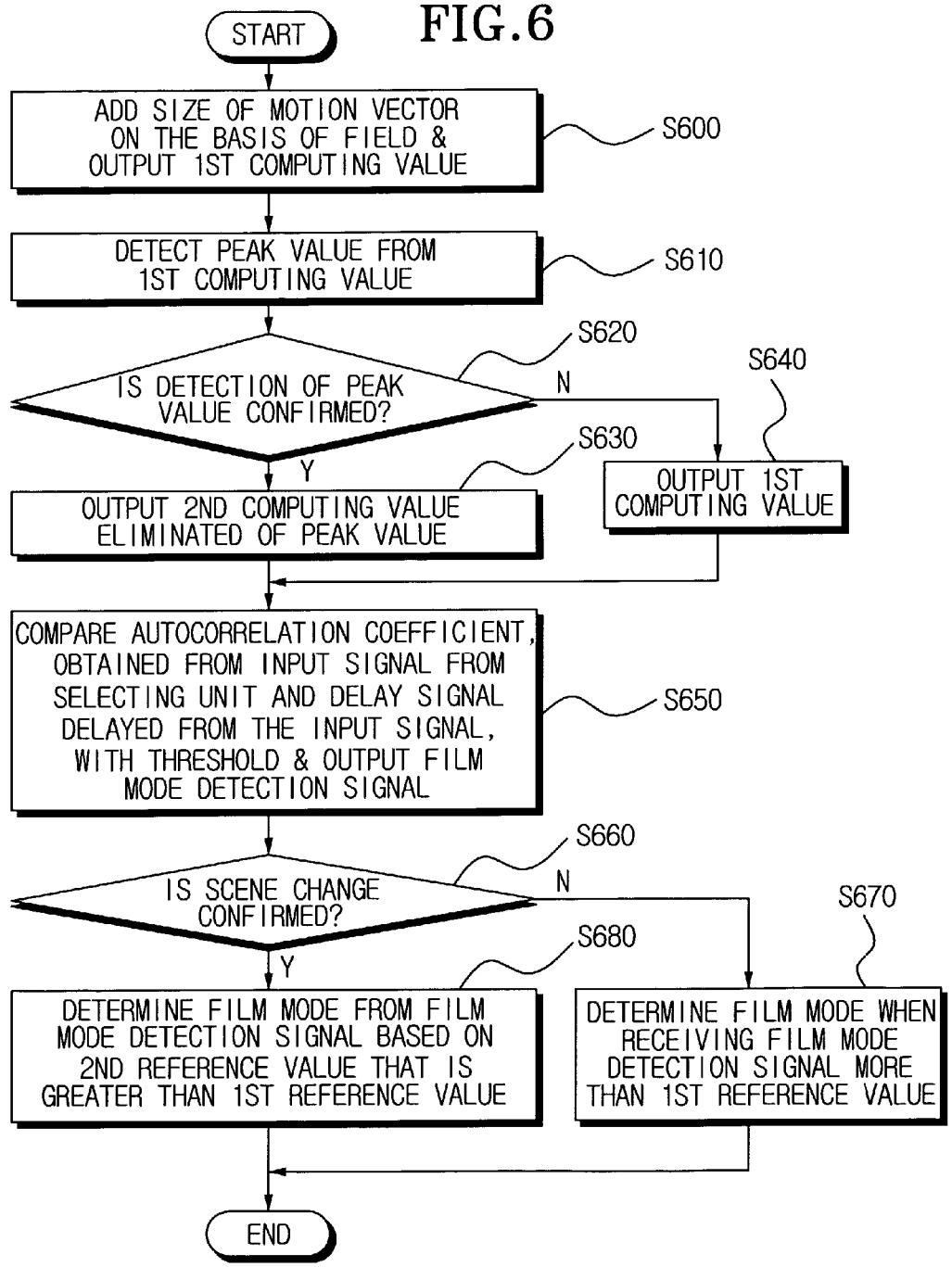

FILM MODE DETECTING APPARATUS AND METHOD THEREOF

BACKGROUND OF THE INVENTION

1. Field of the Invention

The present invention generally relates to a film mode detecting apparatus and a method thereof, and more particularly, it relates to a film mode detecting apparatus for discriminating mode of an input image signal between film mode or non-film mode, and method thereof. The present application is based on Korean Patent Application No. 2001-74729, filed Nov. 28, 2001, which is incorporated herein by reference.

2. Description of the Prior Art

Generally, a film is made at the rate of 24 frames/second. In order to convert the rate of the film to the broadcasting standard of 60 fields/second of the National Television Standards Committee (NTSC), the rate of the picture source needs to be converted into a rate identical to that of the NTSC TV signal, which is 60 fields/second.

For showing film on a television, each sheet of film is scanned by a telecine. PAL or SECAM schemes scan twenty-five (25) frames/second, a rate which is not significantly different from the frame scanning rate of the film. Thus, PAL and SECAM formats pose no problem.

The NTSC scheme, however, scans signals at a rate of 60 fields/second, which is considerably different from the frame scanning rate of the film. Accordingly, for transmitting film for display on NTSC TVs, the screen speed must be adjusted to provide matching frame rates.

More specifically, the signals of 24 frames/second need to be converted into a rate of 60 fields/second, which means five (5) fields need to be generated from every two frames of the film. Accordingly, of two frames, three fields of the first frame are scanned, while two fields of the second frame are scanned by the 3:2 pulldown.

If the image signals are used with a film source and a non-film source mixed therein, in the process of interlace-to-progressive scanning conversion, 24 frames are increased to 30 frames by the characteristic of the 3:2 pulldown, and accordingly, 12 frames have image deterioration on the corresponding still images.

Further, in slow-motion play, there are unnatural pauses in the images. Another problem is that 24 frames of film source are stored at 60 fields, and thus storage capacity is wasted.

FIG. 1 is a block diagram showing a conventional film mode detecting apparatus.

As shown in FIG. 1, the film mode detecting apparatus includes a first buffer 100, a second buffer 101, a third buffer 102, an absolute value calculating unit 104, an adder 105, a limiter 106, a band-pass filter 107, a power calculating unit 108 and a mode detecting unit 109.

First, second and third buffers 100, 101, 102 store externally-inputted image signals with respect to each field. Differences between two different fields are obtained.

The absolute value calculating unit 104 calculates an absolute value of the pixel difference of the two fields.

The adder 105 adds up the absolute values calculated by the absolute value calculating unit 104. The adder 105 obtains median data of the sums of absolute differences of the pixels.

The limiter 106 removes values of the median data that exceed a predetermined threshold.

The band-pass filter 107 extracts signals at the period of 5.

The power calculating unit 108 calculates power of filtered signals. A large power value is calculated by the power calculating unit 108 with respect to the signals with the period of 5, while a value closer to '0' is calculated with respect to the other signals.

The mode detecting unit 109 detects a mode of the inputted signals based on the calculated signal values. The mode detecting unit 109 compares the calculated power value of the signals with the predetermined threshold, and determines that the signals are from a film source when the power value exceeds the threshold, while determining that the signals are from a non-film source when the power value is under the threshold.

The conventional film mode detecting apparatus computes the SAD (sum of absolute differences) of two fields that are at a constant interval of 1/30 second, and detects the mode of the signal by using period of 5. The conventional film mode detection, however, loses its benefits when more noise is added disrupting the periodicity.

Further, in removing peaks which occur due to scene change, the limiter 106 excises values irrespective of degree of SAD. That is, the limiter 106 sometimes excises the values even when a relatively small SAD value is obtained. When this happens, accuracy of periodicity output deteriorates.

The mode detecting unit 109 pre-sets a threshold, and detects the mode of the signals by comparing the calculated power value with the preset threshold. As there can be variation in power value according to incoming streams, a fixed threshold is preset. When using the fixed threshold, an error can be generated in detecting the mode of signals.

Even though a threshold is set through a number of experiments, there still remains a high possibility of inaccuracy by the conventional film mode detection, as there are various types of incoming streams, and the slopes of noise and screen variations that occur due to, for example, fluctuation of the change of motion.

SUMMARY OF THE INVENTION

Accordingly, it is an object of the present invention to provide a film mode detecting apparatus for detecting a mode of an incoming image signal using a periodicity of motion vectors of high autocorrelativity and a method thereof.

The above object is accomplished by a film mode detecting apparatus according to the present invention, including a motion vector computing unit for adding size of motion vectors with respect to each field, thereby outputting a first computing value; a peak value eliminating unit for detecting a peak value in the first computing value, and if the peak value is detected, eliminating the peak value from the first computing value and outputting a resultant value; a mode detecting unit for comparing an autocorrelation coefficient with a predetermined threshold, thereby outputting a film mode detection signal, the autocorrelation coefficient obtained from an input signal received from the peak value eliminating unit and a delayed signal delayed from the input signal; and a mode determining unit for determining a film mode when being successively inputted with the film mode detection signal from the mode detecting unit as often as, or more often than, a first reference value.

The motion vector computing unit includes a motion vector estimating unit for estimating a movement trajectory of an input field and a previous field, thereby extracting the motion vector; a size detecting unit for receiving the extracted motion vector, thereby outputting the size of the motion vector; and an adder for adding the size of the motion vector with respect to each field, thereby outputting the first computing value.

Further provided is a coring unit for outputting '0' as the size of the motion vector when the size of the motion vector is smaller than a predetermined reference.

The peak value eliminating unit includes a maximum value detecting unit for detecting the peak value in the first computing value; a peak value storing unit for sequentially storing the peak value detected by the maximum value detecting unit; a filter for eliminating the peak value exceeding the predetermined threshold, thereby outputting a second computing value; and a selecting unit for outputting the first computing value when the peak value is detected, and outputting the second computing value when the peak value is not detected.

Further provided is a scene change detecting unit for detecting a scene change when the peak value is detected by the maximum value detecting unit, by comparing the detected peak value with a previously detected peak value, and outputting a scene change detection signal to the mode determining unit. The mode determining unit determines whether it is a film mode or not when receiving the scene change detection signal, based on a second reference value which is greater than the first reference value.

The mode detecting unit includes a correlation coefficient calculating unit for calculating the autocorrelation coefficient from the signal received from the peak value eliminating unit; and a comparing unit for outputting the film mode detecting signal when the autocorrelation coefficient is greater than the predetermined threshold.

Further provided is a scene change detecting unit for detecting a scene change based on a comparison between the peak value and the previously detected peak value, and providing the mode determining unit with a scene change detection signal. The mode determining unit determines the film mode based on a second reference value when receiving the scene change detection signal, the second reference value being greater than the first reference value.

According to the present invention, a film mode detecting method includes the steps of: adding size of motion vector with respect to each field, thereby outputting a first computing value; detecting a peak value in the first computing value, eliminating the peak value from the first computing value if there is the peak value detected, and outputting a resultant value; comparing an autocorrelation coefficient with a predetermined threshold, thereby outputting a film mode detection signal, the autocorrelation coefficient being obtained from an input signal received from the peak value eliminating step and a delay signal delayed from the input signal; and determining a film mode when successively receiving the film mode detection signal of the detection signal outputting step as often as, or more often than, the first reference value.

The first computing value calculating step includes the steps of: estimating a movement trajectory of an input field and a previous field, thereby extracting the motion vector; receiving the extracted motion vector, thereby outputting the size of the motion vector; and adding up the size of the motion vector with respect to each field, thereby outputting the first computing value.

Prior to the first computing value outputting step, further provided is the step of outputting value '0' as the size of the motion vector when the size of the motion vector is smaller than the predetermined reference.

The peak value eliminating step includes the steps of: detecting the peak value in the first computing value; successively storing the peak value detected in the peak value detecting step; eliminating the peak value exceeding the predetermined threshold, thereby calculating a second computing value; and outputting the first computing value when the peak value is detected, and outputting the second computing value when the peak value is not detected.

Further provided is the step of detecting a scene change by comparing the detected peak value with a previously detected peak value and outputting the scene change detection signal when the peak value is detected in the peak value detecting step. The mode determining step determines the film mode based on a second reference value when receiving the scene change detection signal, the second reference value being greater than the first reference value.

The mode detecting step includes the steps of: calculating the autocorrelation coefficient from the input signal received from the peak value eliminating step and the delay signal; and outputting the film mode detection signal when the autocorrelation coefficient is greater than the predetermined threshold.

When the peak value is detected, further provided is the step of detecting whether there is a scene change or not by comparing the detected peak value with a previously detected peak value, and providing the mode determining step with the scene change detection signal. The mode determining step determines the film mode based on a second reference value according to the detection result, the second reference value being greater than the first reference value.

Accordingly, by using the sum of sizes of motion vectors of high autocorrelativity to obtain characteristics of 3:2 pulldown for a detection of mode of the inputted image signals, film mode detection can be performed with high accuracy.

BRIEF DESCRIPTION OF THE DRAWINGS

The above-mentioned objects and features of the present invention will be more apparent by describing the preferred embodiment of the present invention by referring to the appended drawing, in which:

FIG. 6 is a flowchart showing a method of film mode detection according to the present invention.

DETAILED DESCRIPTION OF THE PREFERRED EMBODIMENT

Hereinafter, the preferred embodiment of the present invention will be described in greater detail with reference to the accompanying drawings.

Figure 1:
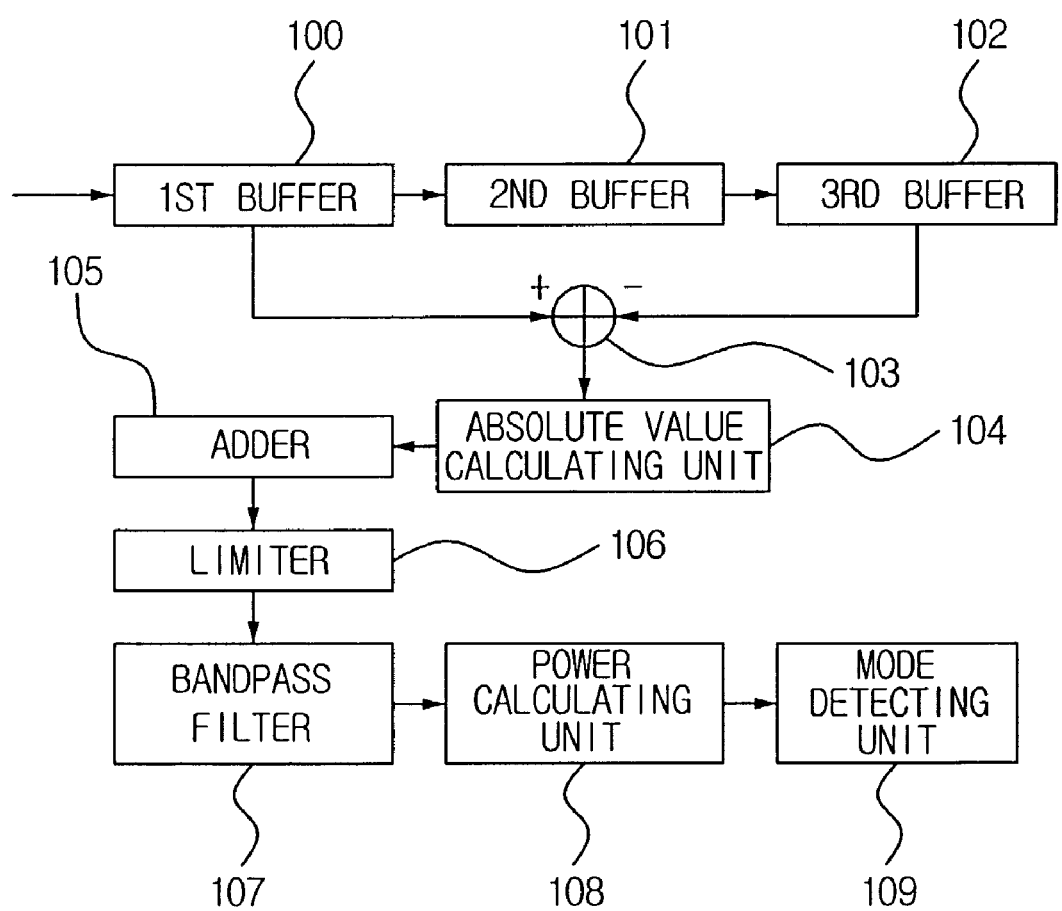
FIG. 1 is a block diagram of a conventional film mode detecting apparatus.
Figure 2:
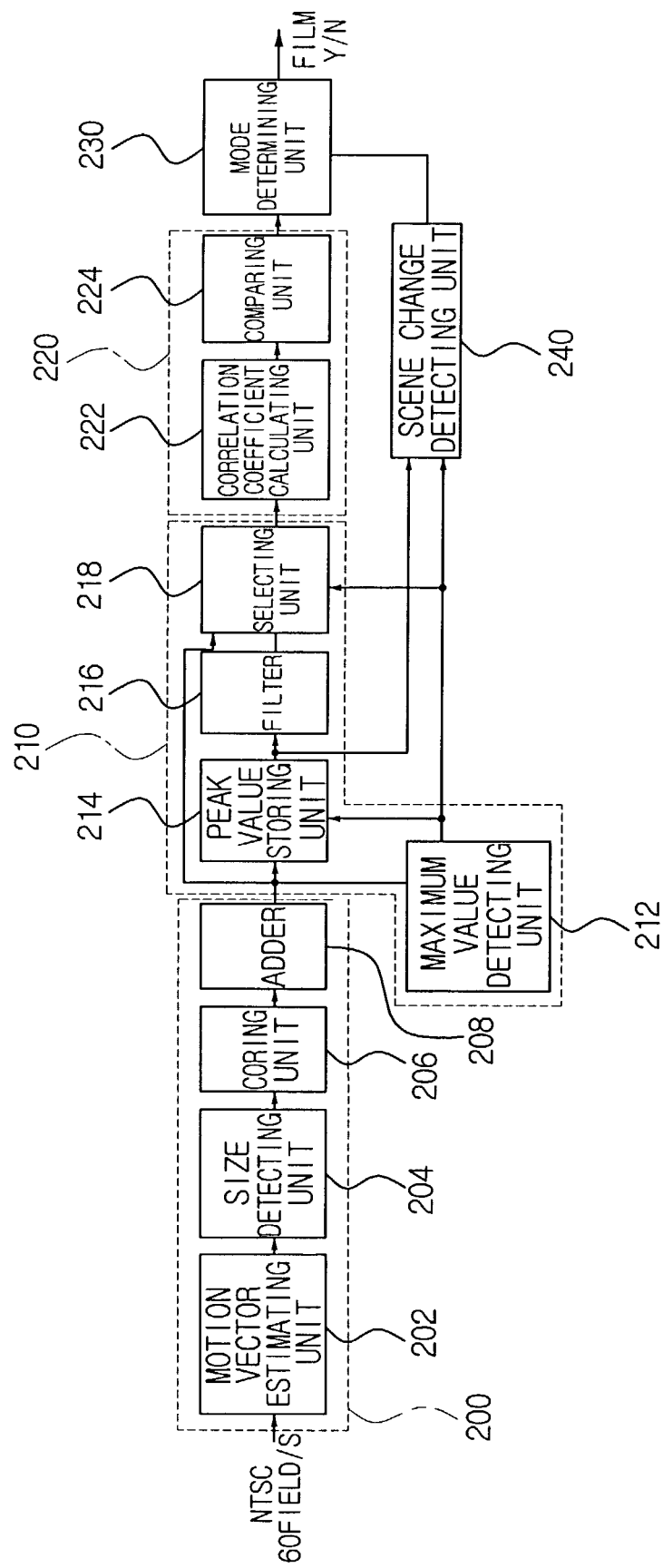
FIG. 2 is a block diagram showing a film mode detecting apparatus according to a preferred embodiment of the present invention.

FIG. 2 is a block diagram showing a film mode detecting apparatus according to the preferred embodiment of the present invention.

Referring to FIG. 2, the film mode detecting apparatus includes a motion vector computing unit 200, a peak value removing unit 210, a mode detecting unit 220, a mode determining unit 230 and a scene change unit 240.

The motion vector computing unit 200 adds the size of the motion vectors with respect to each field and outputs a first computing value.

The motion vector computing unit 200 includes a motion vector estimating unit 202, a size detecting unit 204, a coring unit 206 and an adder 208.

The motion vector estimating unit 202 extracts motion vectors by estimating motion trajectory of the input field and the previous field.

Figure 3:
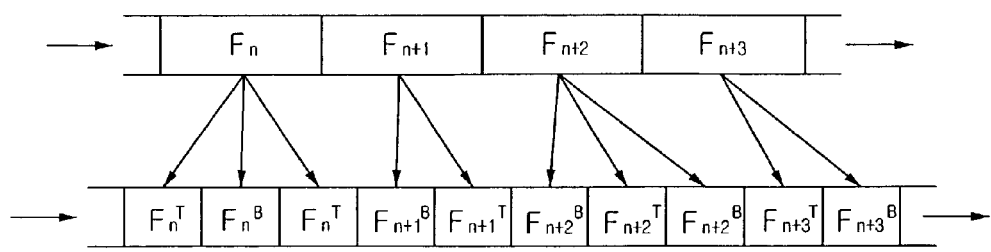
FIG. 3 is a view showing 3:2 pulldown according to the present invention.

FIG. 3 is a view showing the 3:2 pulldown process according to the present invention.

A 3:2 pulldown scheme converts the film rate of 24 frames/second into the TV rate of 30 frames/second. In other words, it converts 24 frames in 2 sheets into 60 fields in 5 sheets. The first frame of the two frames is converted to 3 fields, while the other (second) frame is converted to 2 fields.

The first frame is constructed of a top field of odd lines, a bottom field of even lines and another field of odd or even lines. The second frame is constructed of a top field of odd lines, and a bottom field of even lines.

In other words, one film frame $F_n$ is constructed of fields $F_n^T, F_n^B, F_n^T$, while the other film frame $F_{n+1}$ is constructed of fields $F_{n+1}^B, F_{n+1}^T$. According to this, the film is converted into the same rate as the TV, which is 60 fields/second. As a result, the film can be scanned to the TV naturally.

The motion vector estimating unit 202 extracts motion vectors by estimating motion trajectories of the fields obtained by the 3:2 pulldown.

The size detecting unit 204 receives the motion vectors extracted from the motion vector estimating unit 202 and outputs the size of the motion vectors. The size of the motion vectors can be obtained from a square root of the sums of squares of respective components. More simply, the size of the motion vectors can be obtained from the sum of absolute values of the respective components.

The coring unit 206 outputs '0' as a size of the motion vector when the size of the motion vectors is determined to be smaller than a predetermined reference value. The coring unit 206 outputs the size of the motion vectors inputted from the size detecting unit 204 when the size of the motion vectors is determined to be greater than the predetermined reference.

The coring unit 206 outputs '0' as the size of the motion vector when the size is smaller than the predetermined reference value, because sometimes the motionless area can be determined as having motion due to factors such as quantization error in the case that the signals are processed by an MPEG encoder/decoder. Accordingly, the coring unit 206 determines that the vector has no motion and outputs '0' when the size of the motion vector inputted from the size detecting unit 206 is smaller than the predetermined reference value. The predetermined reference value is preferably a very small value.

Figure 4:
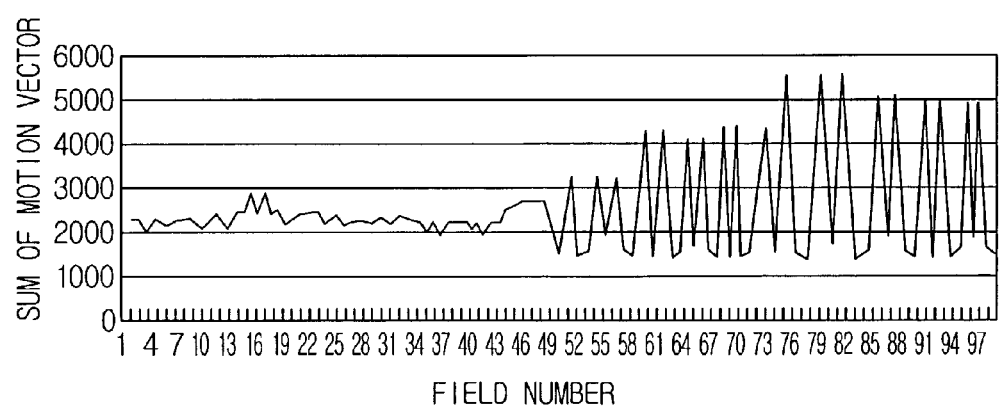
FIG. 4 is a view showing a waveform of the sums of motion vector sizes with respect to the respective fields.

FIG. 4 is a view showing a waveform of the sums of the motion vector sizes with respect to the respective fields.

The adder 208 adds the sizes of the motion vectors with respect to each field, and outputs first computing values. If the incoming stream is determined to be from a film source, as shown in FIG. 4, the adder 208 outputs values such as the values shown between field no. 51 and field no. 100. If the incoming stream is determined to be from a non-film source, the adder 208 outputs values such as the values shown between field no. 1 and field no. 50.

Sums of the motion vector sizes are easily detected by using autocorrelation of motion vectors. Accuracy is hardly expected, however, in the detection of the sums of the motion vector sizes in the case of a scene change, because the sums of the motion vector sizes usually come out high. In order to prevent such inaccuracy, there is a maximum value detecting unit 212 detecting a peak value from the first computing value outputted from the adder 208.

The peak value eliminating unit 210 detects the peak value from the first computing values, eliminates the peak value from the first computing value if there is any, and outputs the resultant value.

The peak value eliminating unit 210 includes the maximum value detecting unit 212, a peak value storing unit 214, a filter 216 and a selecting unit 218.

The maximum value detecting unit 212 detects the peak value from the first computing values. In other words, the maximum value detecting unit 212 determines whether the current value is the peak value or not. Peak value detection can be performed by using differentiation, or simply by comparing previous and following values. For the purpose of finding peak values more accurately, it is preferred that the maximum value detecting unit 212 is provided with a device for correcting an error.

The peak value storing unit 214 sequentially stores the peak values detected by the maximum value detecting unit 212.

The filter 216 receives peak values of the peak value storing unit 214, and eliminates peak values by median-filtering the inputted peak values, for example, Tap=3, or 5. As a result, the filter 216 outputs the second computing value.

The selecting unit 218 selectively outputs first and second computing values in accordance with the peak value detection result of the maximum value detecting unit 212. When the peak value is detected by the maximum value detecting unit 212, the selecting unit 218 outputs the second computing value, which is median-filtered by the predetermined threshold. When there is no peak value detected by the maximum value detecting unit 212, the selecting unit 218 outputs the first computing value, which is outputted from the adder 208.

The mode detecting unit 220 compares an autocorrelation coefficient, which is obtained from the input signal inputted from the peak value eliminating unit 210 and the delay signal delayed from the input signal, with the predetermined threshold, and outputs a film mode detecting signal.

The mode detecting unit 220 includes a correlation coefficient calculating unit 222 and a comparator 224. The correlation coefficient calculating unit 222 calculates auto-correlation coefficients from the input signal inputted from the selecting unit 218 and the delay signal delayed from the input signal.

The correlation coefficient calculating unit 222 obtains the autocorrelation coefficient from the input signal and the delay signal, which is delayed for five (5) fields, i.e., for 5/60 second. The autocorrelation coefficients are derived from the Pearson's Autocorrelation Coefficient.

The Pearson's Autocorrelation Coefficient has a characteristic in which a signal with period K has a greater sum of products of the class values, which are obtained by subtracting averages from the original data and delay data delayed from the original data by an interval of K.

Accordingly, in the case of obtaining autocorrelativity with K=5, the correlation coefficient calculating unit 222 outputs a value closer to '1' with respect to the signal having periods closer to 5. The correlation coefficient calculating unit 222 outputs a value closer to '0' with respect to the signal having periods other than 5. The correlation coefficient calculating unit 222 outputs a value closer to '−1' with respect to the signal having periods closer to 5 in the negative direction.

As the input signals from the film source have a period of 5, the correlation coefficient calculating unit 222 outputs values to '1' , while outputting values equal to, or below '0.5' with respect to video signals that have periods other than 5.

Figure 5:
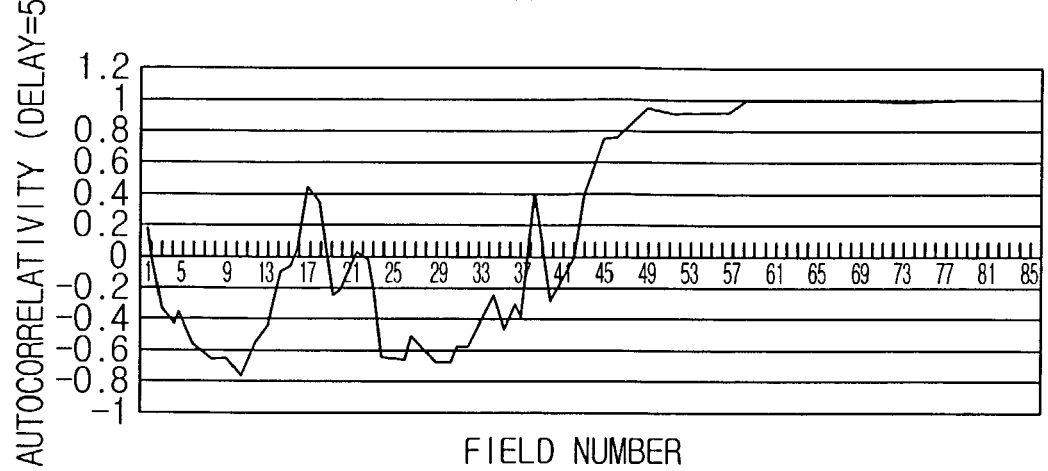
FIG. 5 is a view showing a waveform of inter-correlativity with respect to the sums of motion vectors of FIG. 4.

FIG. 5 is a view showing waves indicating the autocorrelation coefficients of the sums of the motion vectors of FIG. 4.

Referring to FIG. 5, the calculated autocorrelation coefficients become closer to value 1 as there is higher autocorrelativity. Generally, autocorrelativity from about 0.7 to about 0.8 is determined as high.

The comparing unit 224 outputs a film mode detection signal when the autocorrelation coefficient from the correlation coefficient calculating unit 222 is greater than a predetermined threshold. The comparing unit 224 compares the threshold (e.g., 0.85) with the autocorrelativity and outputs the value '1' when the autocorrelativity is higher than the threshold, while outputting the value '0' when the autocorrelativity is smaller than the threshold.

The mode determining unit 230 determines the film mode when it successively receives the film mode detection signal from the mode detection unit 220 as often as, or more often than, a first reference value.

The mode determining unit 230 determines the source of input signals between a film source and a non-film source according to the output value from the comparing unit 224. In other words, when the output value from the comparing unit 224 is '1', the mode determining unit 230 determines that the image signal is from a film source. When the output value from the comparing unit 224 is '0', the mode determining unit 230 determines that the image signal is from a non-film source. When the output value '1' corresponding to the film source is successively outputted from the comparing unit 224 as often as, or more often than, the first reference value (e.g., 3 times or more), the mode determining unit 230 determines the mode of the input signal to be the film mode.

According to a scene change detection by the scene change detection unit 240, the mode determining unit 230 determines the mode of the signals. When a scene change is detected by the scene change detecting unit 240, the mode determining unit 230 determines the mode of the signals based on a greater second reference value instead of the first reference value, because there is a possibility that the status of the film mode detection signal has changed.

In this case, the mode determining unit 230 determines the film mode when the value '1' corresponding to the film source is successively input from the comparing unit 224 as often as, or more often than, the second reference value (e.g., 5 times). For example, in the case that the film mode detection signal of 0011011111 is inputted from the comparing unit 224, and the scene change detection signal is inputted from the scene change detection unit 240, the mode determining unit 230 outputs 0000011111.

Meanwhile, if there is no detection of scene change, the mode determining unit 230 checks the film mode detection signal inputted from the comparing unit 224, and determines the film mode only when the film mode detection signal is inputted more often than the first reference value.

Meanwhile, with respect to the changes of the inputted values, the mode determining unit 230 determines the mode of the image signal that is to be outputted via a status transition path. The mode determining unit 230 stands by at the beginning of detecting the changed value from the comparing unit 224, and detects the change of signal mode when the same changed signal is successively inputted as often as, or more often than, the first reference value (e.g., 3 times).

For example, let the video mode be '0', and the motion picture film mode be '1'. When the film mode detection signal of 0011010000 is inputted from the comparing unit 224, the mode determining unit 230 outputs 0000000000 as there are film mode detection signals below the first reference value.

When the film mode detection signal of 0011010111 is inputted from the comparing unit 224, the mode determining unit 230 outputs 0000000111 as there are film mode detection signals exceeding the first reference value.

When the maximum value detecting unit 212 detects a peak value, the scene change detecting unit 240 compares the peak value with the previously detected peak value, and detects whether there has been a scene change or not.

FIG. 6 is a flowchart showing a method for detecting a film mode according a preferred embodiment of the present invention.

Referring to FIG. 6, the adder 208 adds up the size of the motion vectors of the incoming image signals with respect to each field, and outputs a first computing value (step S600).

The maximum value detecting unit 212 detects a peak value from the first computing value outputted from the adder 208 (step S610). The maximum value detecting unit 212 checks on the first computing value outputted from the adder 208, to determine whether there is peak value or not (step S620).

When the maximum value detecting unit 212 detects the peak value, the selecting unit 218 outputs a second computing value, which is obtained by removing a peak value exceeding a predetermined threshold (step S630).

Meanwhile, if there is no peak value detected in S620, the selecting unit 218 outputs the first computing value, which is outputted from the adder 208 (step S640).

The mode detecting unit 220 compares the autocorrelation coefficient, which is obtained from the inputted signal and signal delayed from the input signal, with a predetermined threshold, and outputs a film mode detection signal (step S650). The mode detecting unit 220 compares the predetermined threshold (e.g., 0.85) with the autocorrelation coefficient, and outputs '1' when the autocorrelation coefficient is greater than the threshold, while outputting '0' when the autocorrelation coefficient is smaller than the threshold.

Having received the film mode detection signal from the mode detecting unit 220, the mode determining unit 230 checks whether or not the scene change detection signal is inputted from the scene change detecting unit 240 (step S660).

When there is no scene change detection signal detected in S660, and when the film mode detection signal is successively inputted as often as, or more often than, the first reference value, for example, for three or more times, the mode determining unit 230 determines it to be the film mode (step S670).

Meanwhile, when there is a scene change detection signal detected in S660, the mode determining unit 230 determines the film mode based on the greater second reference value (e.g., 5) instead of the first reference value (e.g., 3) (step S680).

With the apparatus and method for detecting film mode according to the present invention, detection of film mode of inputted image signals can be carried out with high accuracy by using the sum of the sizes of the motion vectors having high autocorrelativity. Accordingly, a film source of 24 frame/second rate can be converted to the rate of the NTSC broadcasting standard, which is 60 fields/second. As a result, image deterioration and waste of storage space can be prevented.

Although the preferred embodiment of the present invention has been described, it will be understood by those skilled in the art that the present invention should not be limited to the described preferred embodiment, but various changes and modifications can be made within the spirit and scope of the present invention as defined by the appended claims.

What is claimed is:

1. A film mode detecting apparatus, comprising:
   a motion vector computing unit for adding a size of motion vectors with respect to each field, thereby outputting a first computing value;
   a peak value eliminating unit for detecting a peak value in the first computing value, and the peak value is detected, eliminating the peak value from the first computing value and outputting a resultant value;
   a mode detecting unit for comparing an autocorrelation coefficient with a predetermined threshold, thereby outputting a film mode detection signal, the autocorrelation coefficient obtained from an input signal received from the peak value eliminating unit and a delay signal delayed from the input signal; and
   a mode determining unit for determining a film mode when the film mode detection signal is successively inputted from the mode detecting unit as often as, or more often than, a first reference value.

2. The film mode detecting apparatus of claim 1, wherein the motion vector computing unit comprises:
   a motion vector estimating unit for estimating a movement trajectory of an input field and a previous field, thereby extracting the motion vectors;
   a size detecting unit for receiving the extracted motion vectors, thereby outputting the size of the motion vectors; and
   an adder for adding the size of the motion vectors with respect to each field, thereby outputting the first computing value.

3. The film mode detecting apparatus of claim 2, further comprising a coring unit for outputting '0' as the size of the motion vectors when the size of the motion vectors is smaller than a predetermined reference.

4. The film mode detecting apparatus of claim 1, wherein the peak value eliminating unit comprises:
   a maximum value detecting unit for detecting the peak value in the first computing value;
   a peak value storing unit for sequentially storing the peak value detected by the maximum value detecting unit;
   a filter for eliminating the peak value exceeding the predetermined threshold, thereby outputting a second computing value; and
   a selecting unit for outputting the first computing value when the peak value is detected, and outputting the second computing value when the peak value is not detected.

5. The film mode detecting apparatus of claim 4, further comprising a scene change detecting unit for detecting a scene change when the peak value is detected by the maximum value detecting unit, by comparing the detected peak value with a previously detected peak value, and outputting a scene change detection signal to the mode determining unit, wherein the mode determining unit determines whether or not a film mode occurs when receiving the scene change detection signal, based on a second reference value which is greater than the first reference value.

6. The film mode detecting apparatus of claim 1, wherein the mode detecting unit comprises:
   a correlation coefficient calculating unit for calculating the autocorrelation coefficient from the signal received from the peak value eliminating unit and the delay signal; and
   a comparing unit for outputting the film mode detecting signal when the autocorrelation coefficient is greater than the predetermined threshold.

7. The film mode detecting apparatus of claim 1, further comprising a scene change detecting unit for detecting a scene change based on a comparison between the peak value and the previously detected peak value, and providing the mode determining unit with a scene change detection signal, wherein
   the mode determining unit determines the film mode based on a second reference value when receiving the scene change detection signal, the second reference value being greater than the first reference value.

8. A film mode detecting method, comprising the steps of:
   adding a size of motion vectors with respect to each field, thereby outputting a first computing value;
   detecting a peak value in the first computing value, eliminating the peak value from the first computing value if the peak value is detected, and outputting a resultant value;
   comparing an autocorrelation coefficient with a predetermined threshold, thereby outputting a film mode detection signal, the autocorrelation coefficient being obtained from an input signal received from the peak value eliminating step and a delay signal delayed from the input signal; and
   determining a film mode when successively receiving the film mode detection signal of the detection signal outputting step as often as, or more often than, the first reference value.

9. The film mode detecting method of claim 8, wherein the first computing value calculating step comprises the steps of:
   estimating a movement trajectory of an input field and a previous field, thereby extracting the motion vectors;
   outputting the size of the motion vectors; and
   adding up the size of the motion vectors with respect to each field, thereby outputting the first computing value.

10. The film mode detecting method of claim 9, prior to the first computing value outputting step, further comprising the step of outputting value '0' as the size of the motion vectors when the size of the motion vectors is smaller than the predetermined reference.

11. The film mode detecting method of claim 8, wherein the peak value eliminating step comprises the steps of:
   detecting the peak value in the first computing value;
   successively storing the peak value detected in the peak value detecting step;
   eliminating the peak value exceeding the predetermined threshold, thereby calculating a second computing value; and
   outputting the first computing value when the peak value is detected, and outputting the second computing value when the peak value is not detected.

12. The film mode detecting method of claim 11, further comprising the step of detecting a scene change by comparing the detected peak value with a previously detected peak value and outputting the scene change detection signal when the peak value is detected in the peak value detecting step, and the mode determining step determines the film mode based on a second reference value when receiving the scene change detection signal, the second reference value being greater than the first reference value.

13. The film mode detecting method of claim 8, wherein the mode detecting step comprises the steps of:
- calculating the autocorrelation coefficient from the input signal received from the peak value eliminating step and the delay signal; and
- outputting the film mode detection signal when the autocorrelation coefficient is greater than the predetermined threshold.

14. The film mode detecting method of claim 8, when the peak value is being detected, further comprising the step of detecting whether there is a scene change or not by comparing the detected peak value with a previously detected peak value, and providing the mode determining step with the scene change detection signal, and
- the mode determining step determines the film mode based on a second reference value according to the detection result, the second reference value being greater than the first reference value.

* * * * *